455-7 SR
E4819 OR 2,951,128
[redacted]
[redacted]
SEARCH ROOM

INVENTOR
B. A. KINGSBURY
BY Charles Scott Phelan
ATTORNEY

INVENTOR
B. A. KINGSBURY
BY Charles Scott Phelan
ATTORNEY

Aug. 30, 1960 B. A. KINGSBURY 2,951,128

SYSTEM FOR TESTING UNATTENDED REPEATERS

Filed May 15, 1958 3 Sheets-Sheet 3

INVENTOR
B. A. KINGSBURY
BY Charles Scott Phelan
ATTORNEY 2,951,128

SYSTEM FOR TESTING UNATTENDED REPEATERS

Burton A. Kingsbury, New Providence, N.J., assignor to Bell Telephone Laboratories, Incorporated, New York, N.Y., a corporation of New York Filed May 15, 1958, Ser. No. 735,491

20 Claims. (Cl. 179—175.31)

This invention relates to a system for quantitatively measuring the steady-state signal level in a remote amplifier circuit.

In many electrical communication systems such as cable transmission systems of either the overland or submarine variety, it is desirable to know the signal output level of a repeater in the cable system. If the output level is known quantitatively, it is possible to compare the performance of each repeater with its known optimum performance for long repeater life. With this information, the cable system operating level can be set with precision to the maximum possible level for the most economical compromise between good performance and long repeater life without overloading any one of the repeaters. In addition, once the output signal level of each repeater in a cable sytem is known, it is possible to predict with a reasonable degree of accuracy which repeater sections in the cable system are approaching failure so that arrangements may be made for the replacement of such repeaters when weather conditions are favorable. The latter point is of particular importance in connection with submarine cable systems. Furthermore, when it becomes necessary to replace a particular section of a cable system which includes one or more repeaters, the repeater output signal level data serves as a guide in determining whether or not it is necessary to make circuit changes such as employing a different number of repeaters in the replacement section, respacing the same number of repeaters in the replacement section, or introducing equalization.

At the present time, transmission measurements are made in submarine cable systems by comparing cable and repeater performance characteristics of individual cable sections, which are determined before cable is laid, with total system measurements made at various times after a cable has been laid. Such comparisons are limited by the available data on each amplifier and by the estimated cable attenuation. The response of each amplifier, as measured in the factory, may be affected by installation and aging. The frequency characteristic of the cable alone is probably known only with considerable uncertainty because of factory measurement difficulties.

Certain cable systems employ signature crystals at each repeater as described for example in the United States Patent No. 2,580,097 which issued December 25, 1951, to L. M. Ilgenfritz and R. W. Ketchledge. The object of such crystals is, as described in the above-identified Ilgenfritz et al. patent, to produce an amplitude peak at the cable system receiving terminal for noise signals generated in the repeater. The amplitude in the cable terminal of the noise peak at each crystal frequency is an indication of the performance of the corresponding repeater. Since each crystal resonance, apart from modifications produced by crystal aging, is a definite function of temperature, the crystal frequency measurements have been utilized also to estimate ocean temperature at specific repeaters. However, in the Ilgenfritz et al. system it is not convenient to obtain a quantitative measurement of the steady-state signal output level at each repeater since their system depends upon the measurement of the amplitudes of noise spikes which must be transmitted through other repeaters and cable sections in most cases.

Accordingly, it is one object of this invention to measure the steady-state signal level of inaccessible amplifier circuits.

Another object is to cause the signal at some point in an amplifier to change the temperature of a temperature-sensitive resonant device in the amplifier circuit to shift the frequency of an irregularity in the gain-versus-frequency response characteristic of the amplifier.

A further object is to measure the steady-state signal level in the output of an amplifier as a function of the incremental change in the resonant frequency of a signature crystal connected therein.

Yet another object is to associate a steady-state increment of amplifier signal with a proportional increment in the resonant frequency of a piezoelectric crystal.

These and other objects of the invention are attained in an illustrative embodiment thereof by connecting a temperature-sensitive resonant device in a remote amplifier circuit to produce an irregularity in the gain-versus-frequency response characteristic of the amplifier at the resonant frequency of the device. A resistance heating device which is electrically connected to conduct a current that is a function of the amplifier output current is arranged in heat exchanging relationwith the resonant device. Changes in the amplifier output current cause the temperature of the resonant device to be changed thereby altering its resonant frequency. The change in resonant frequency is readily detectable; it is independent of the characteristics of transmission paths and other amplifiers connected to the amplifier under test; and it is a determinable function of the output current. Such a determination may be made either by a preliminary calibration or by calculation.

It is one feature of the invention that the incremental changes in the resonant device frequency are substantially independent of aging.

Another feature is that the amplifier circuit reliability is not reduced by this structure, and it may be enhanced by the resulting increased precision attainable in setting system operating levels.

It is a further feature that the incorporation in an amplifier of the signal level measuring structure of the invention will not necessitate any substantial alteration of the day-to-day procedures of cable operation in a cable system including the amplifier.

An additional feature is that the incorporation of the invention in a new cable system involves only a slight increase in the operating power that would otherwise be required for the cable system and a relatively small increase in the cable ssystem cost; whereas, knowledge of the signal level at each repeater can guide system operation to achieve substantial improvements in system performance and in repeater life.

An additional feature of the invention in relation to submarine cable systems is that ocean temperatures at the cable repeater depths are substantially constant, thereby facilitating the process of obtaining steady-state measurements and comparing the same with laboratory calibrations of the repeaters.

A more complete understanding of the invention and its various objects and advantages may be obtained by a consideration of the following detailed description taken in connection with the attached drawing in which.

Figure 1:
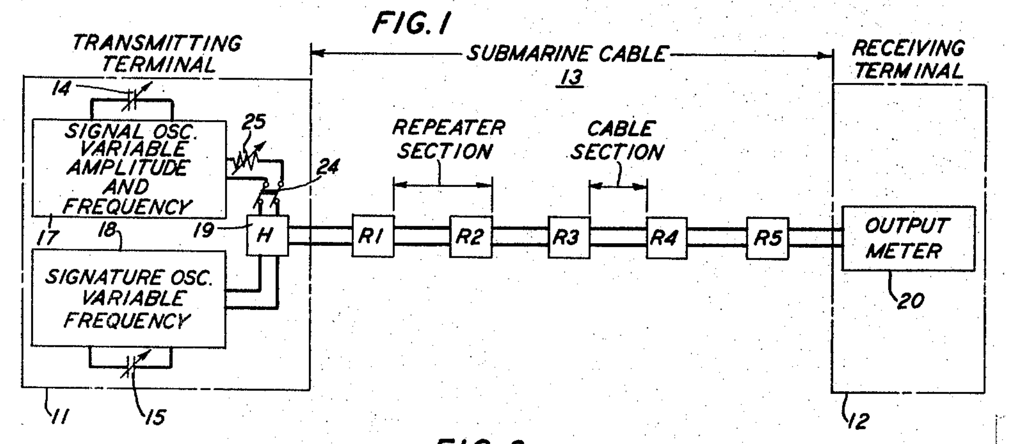
Fig. 1 is a block and line diagram of a submarine cable system embodying principles of the invention.

Referring to Fig. 1, the portion of the cable system there illustrated includes a transmitting terminal 11, a receiving terminal 12, and a submarine cable 13 connected between the terminals 11 and 12. The cable system may be the type which comprises a single circuit adapted for the transmission of a broad band of frequencies that is divided into a plurality of narrower bands of frequencies for the simultaneous transmission of a corresponding plurality of independent signals. The terminal 11 may include, in addition to the conventional terminal equipment such as power supplies and means for separating individual channels for testing, a signal oscillator 17 of variable amplitude and frequency, a calibrated signature oscillator 18 of variable frequency, and a hybrid connector 19 for coupling the outputs of both oscillators 17 and 18 to the input terminals of the cable 13. In a typical system, the frequency of signal oscillator 17 may be varied by an adjustable capacitor 14 between 20 kilocycles per second and 164 kilocycles per second, and the frequency of the signature oscillator may be varied by an adjustable capacitor 15 between 165 kilocycles per second and 175 kilocycles per second. A switch 24 is provided for disconnecting the output of oscillator 17 from hybrid connector 19, and an adjustable resistor 25 is connected in the output of oscillator 17 for varying the amplitude of oscillations.

The submarine cable 13 includes a plurality of repeaters such as the repeaters R1 through R5 spaced along the length thereof. Each repeater plus the cable section connected to the input thereof is herein called a "repeater section." One submarine cable system now in operation includes more than fifty such repeater sections, and each repeater section includes a cable section extending approximately 35 miles between repeaters.

Receiving terminal 12 is connected to the output end of cable 13 and includes an output meter 20 in addition to conventional cable system terminal equipment. Output meter 20 may, for example, comprise a milliammeter which is actuated by suitable tuning and detecting means in a signal receiver that is connected to the output of cable 13.

The operation of the invention in the cable system of Fig. 1 depends upon the arrangement in each of the repeaters of a resonant device connected to produce an irregularity in the gain-versus-frequency response of each repeater and upon a means for changing the temperature of the resonant device in response to changes in the repeater output signal level. This structure and the operation therof will be subsequently described herein in connection with Fig. 2.

Figure 2:
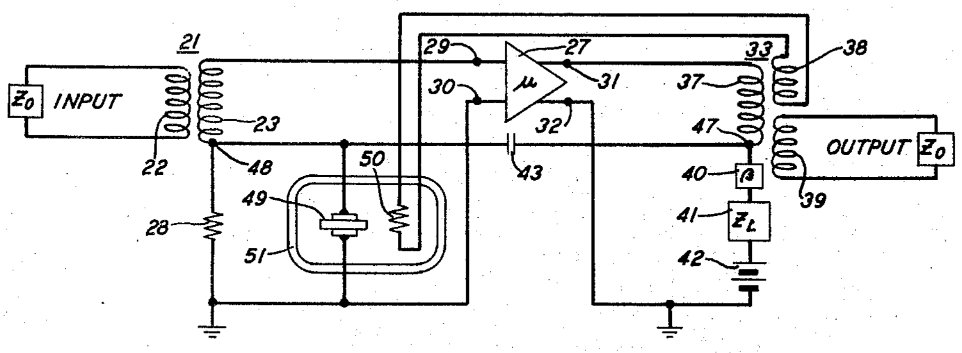
Fig. 2 is a diagram, partially in schematic form and partially in block and line form, of one of the repeaters in the cable system of Fig. 1 illustrating one circuit arrangement incorporating the invention.

Referring to Fig. 2, the simplified repeater there illustrated may be any one of the repeaters R1 through R5 of Fig. 1. The repeater input signal is coupled thereto from a preceding cable section via an input transformer 21 having a primary winding 22 connected to the preceding cable section and a secondary winding 23 which is connected in the input of the amplifier portion 27 of the repeater. An impedance $Z_0$ is shown connected between the terminals of winding 22 and represents the characteristic impedance of a cable section preceding amplifier 27. A resistor 28 is connected in series with secondary winding 23 between the input terminals 29 and 30 of amplifier 27. Terminal 30 is connected to ground. The output of amplifier 27 is coupled from the ouput terminals 31 and 32 thereof to another section of cable by means of an output transformer 33 which includes a primary winding 37 and two secondary windings 38 and 39. The secondary winding 39 is connected directly to the cable section following the repeater as indicated by another characteristic impedance $Z_0$ connected across the terminals of winding 39.

The output circuit of amplifier 27 also includes a feedback-controlling impedance network 40, a load impedance 41, and a battery 42 all connected in series with primary winding 37 between output terminals 31 and 32. Output terminal 32 is connected to ground. The actual feedback coupling from the output to the input of amplifier 27 comprises a capacitor 43 which is connected between a terminal 47 that is common to primary winding 37 and feedback controlling network 40 and a terminal 48 that is common to secondary winding 23 and resistor 28. This feedback connection provides negative feedback from the output to the input of amplifier 27.

The feedback controlling network 40 may include a number of series resonant circuits connected in shunt with one another for altering the total output circuit impedance of amplifier 27 at different frequencies and thereby controlling the amount of voltage which is coupled to the input circuit of amplifier 27 via capacitor 43. This type of feedback control is illustrated, for example, in the above-identified patent to Ilgenfritz et al.

Load impedance 41 may include various impedances that might be found in the output circuit of a repeater in a submarine cable system. Such impedances may be, for example, potential dropping resistances and the heaters for any electron discharge tubes which might be included in amplifier 27.

A piezoelectric, signature crystal 49 is connected in shunt with resistor 28, between the terminal 48 and ground, to provide a low impedance path to ground at the resonant frequency thereof for the negative feedback signals as described in the above-identified patent to Ilgenfritz et al. In this connection, crystal 49 is a shunt impedance in the input circuit of amplifier 27 and in the feedback path, and it comprises with capacitor 43 a shunt impedance in the output circuit of amplifier 27. Crystal 49 may be a quartz crystal, and it has a temperature coefficient of resonant frequency such that the crystal resonant frequency varies in a predetermined manner in response to changes in temperature as will be hereinafter discussed. The crystal 49 in each of the repeaters R1 through R5 in Fig. 1, of course, has a different resonant frequency which is the characteristic signature of such repeater. Crystal 49 has no substantial effect upon repeater gain or upon the negative feedback in the repeater unless the signals which are coupled to the amplifier input include a component at the resonant frequency of crystal 49. When crystal 49 resonates, it shunts the negative feedback signal at the resonant frequency to ground thereby substantially eliminating the negative feedback effect thereon and producing a sharp increase in the repeater output signal.

In accordance with the invention, a resistive heater 50 is electrically connected across secondary winding 38. The heater 50 is physically arranged adjacent to crystal 49 in heat exchanging relation therewith. Crystal 49 and heater 50 are enclosed in an insulated envelope 51 such as, for example, a Dewar flask.

The operation of the repeater illustrated in Fig. 2 is essentially the same as the operation of the Ilgenfritz, et al. amplifier except that changes in the output current of amplifier 27 produce proportional changes in the current which flows through heater 50. Changes in the current in heater 50 of course produce corresponding temperature changes within envelope 51 thereby changing the resonant frequency of crystal 49. An increase in the output current of amplifier 27 causes the resonant frequency of crystal 49 to change in one direction, and a decrease in the output current of amplifier 27 causes the resonant frequency of crystal 49 to change in the opposite direction. The direction of change in the resonant frequency of crystal 49 in response to temperature changes will depend upon the temperature coefficient of resonant frequency of the crystal. Considering the operation of the circuits of Figs. 1 and 2 together, if the signature frequency of each of the repeaters R1 through R5 is different, the resonances of the individual signature crystals are indicated by peak readings on output meter 20 as the output frequency of oscillator 18 is swept through the range of such signature frequencies. The exact resonant frequency of a crystal may be determined from the setting of the calibrated signature oscillator 18 at the time when a maximum output is indicated on meter 20. The resonant frequency may also be determined by a suitable frequency measuring device connected to the cable system in transmitting terminal 11 or in receiving terminal 12. The technique for using the temperature-sensitive resonant frequencies of the signature crystals to measure the signal output level for individual repeaters will now be explained in connection with Figs. 1 and 3.

Figure 3:
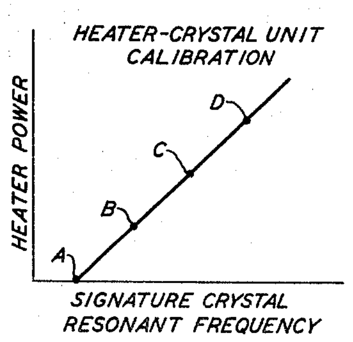
Fig. 3 is a calibration curve for a heater-crystal unit employed in the illustrative embodiments of Figs. 2 and 5 through 9.

Fig. 3 is a calibration chart for a heater-crystal unit including crystal 49, heater 50, and the envelope 51. The unit employed in each repeater would of course have a different calibration chart. The chart shown in Fig. 3 is typical for a unit with a crystal having a positive temperature coefficient. As is well known, the resonant frequency of a particular mode of vibration in a quartz crystal has a temperature coefficient that is a function of such factors as the type of vibration, the crystal dimensions, and the crystal plate edge orientation in relation to the axes of the crystal. The temperature coefficient may be positive or negative depending upon the above factors, and the factors may be so selected as to couple vibrations in different modes in a single crystal to obtain a coefficient of predetermined magnitude and polarity.

A calibration chart for a typical heater-crystal unit in a submarine cable system would be based, for example, on an initial condition in which the only signal in heater 50 would be the crystal resonant frequency signal and in which the temperature of envelope 51 is initially stabilized at some definite temperature. The last-mentioned temperature will generally be approximately 37° Fahrenheit, which is approximately the steady-state temperature at the ocean floor. This condition would produce the zero signal-power point A in Fig. 3. For a particular crystal, the range of resonant frequencies which is important to this invention would yield a calibration curve that is essentially a straight line. With a straight line calibration curve, aging effects may change the resonant frequency at point A; but they will not affect appreciably the slope of the calibration curve. If the signal power in heater 50 is increased in steps to raise the steady-state temperature within envelope 51 in similar steps, the resonant frequency of crystal 49 is also changed, thereby producing the additional calibration points B, C, and D in Fig. 3. The windings of transformer 33 and the resistance of heater 50 must be so designed with respect to the characteristic impedance $Z_0$ that heater 50 can supply to envelope 51 enough heat to maintain the interior of the envelope 51 at stable temperatures over a suitable temperature range such as 0° centigrade to 10° centigrade. A change in temperature through this range for some crystal arrangements may cause a change in resonant frequency of about 50 cycles per second out of 170 kilocycles, a frequency change which is readily measurable with present frequency measuring techniques.

Now, considering the procedure for measuring the output signal level of repeater R1, switch 24 is opened so that there is zero output from signal oscillator 17 on cable 13. The resonant frequency of signature crystal 49 in repeater R1 is determined by adjusting capacitor 15 in calibrated signature frequency oscillator 18 in the known frequency range of signature crystal 49 until a maximum output reading is obtained on output meter 20. The frequency indicated by the setting of capacitor 15 is the resonant frequency of crystal 49 and may, for example, be that corresponding to point A of Fig. 3.

Next, switch 24 is closed and resistor 25 and capacitor 14 are adjusted so that a signal of known amplitude and frequency is applied from signal oscillator 17 to cable 13 via hybrid connector 19. Assuming that this signal increases the output power from amplifier 27, the current in heater 50 is increased, and the temperature within envelope 51 increases to new steady-state level. Consequently, the resonant frequency of crystal 49 increases. The frequency of signature oscillator 18 is now readjusted by changing the setting of capacitor 15 until a steady-state maximum reading is obtained once more on output meter 20.

The new setting of capacitor 15 may indicate a new resonant frequency for crystal 49 in repeater R1 which would correspond to the point B in Fig. 3. The change in signal power applied to heater 50 which was required to change the resonant frequency of crystal 49 from point A to point B is determined from the calibration chart of Fig. 3. Crystal aging has no effect upon these increments of signal power and resonant frequency because the increments will be substantially the same regardless of aging as has been hereinbefore mentioned. Since the assumed initial condition for this example was a resonant frequency at point A in Fig. 3 with zero signal power applied to heater 50, the above-mentioned "change in signal power" actually is the total power applied to heater 50.

Knowing the power added to heater 50 as a result of the output from a signal oscillator 17, and knowing the turns ratios of the windings of transformer 33 and the characteristic impedance $Z_0$ of the cable section which is connected to secondary winding 39, the total power output of amplifier 27 can be readily calculated because it is known that the total power output of amplifier 27 must be divided between the circuits connected to secondary windings 38 and 39 in proportion to the impedances connected to those windings as reflected into the output circuit of amplifier 27 by transformer 33. Thus, a quantitative figure is available for the output power of amplifier 27. A similar result could be obtained by means of a calibration chart for the amplifier 27 indicating output power for different values of power dissipated in heater 50.

If the actual initial condition had included a resonant frequency other than that at point A in Fig. 3 it would indicate that perhaps the ocean temperature at the repeater location was not the 37° Fahrenheit temperature that was used for initial factory calibration. The difference, however, would not be important as long as the same boundary conditions prevail throughout the test. The important factor that must be known is the amount of signal that is added by signal oscillator 17 after the initial resonant frequency of signature crystal 49 has been determined. The input power from signal oscillator 17 to cable 13 is readily determinable since this apparatus is located in transmitting terminal 11. The actual input power to repeater R1 may be measured, as hereinafter described in connection with Fig. 7, or it may be estimated by calculating the attenuation through the intervening cable section assuming that the transmission characteristic thereof is substantially the same as the characteristic of a pretested sample cable section. Such an estimate is, however, not essential since a faulty repeater and its input cable section would be replaced as a unit.

The above-described steps are repeated to determine the power output of each of the remaining repeaters for the same output frequency and amplitude from oscillator 17 in a similar manner. In each case the measured output power of one repeater is utilized to calculate the input power to the next repeater section.

All of the above-described steps are repeated for signals of different frequencies from signal oscillator 17 within the transmission range of the repeaters R1 through R5 thereby obtaining output signal level figures for each of the repeaters at the different frequencies which these repeaters may be expected to transmit under ordinary transmission conditions. It should be noted that it is possible to improve the accuracy of signal level measurements made in the above-described manner if each measurement that is made with a particular output amplitude and frequency from signal oscillator 17 is repeated one or more times with the same frequency and a different amplitude.

In order to have a convenient basis for evaluation, the quantitative output power data are converted to gain data. Knowing the input power to each repeater section and the signal power output of each repeater amplifier at the various operating frequencies, the gain from the input to a repeater section to the output of the repeater amplifier in that section can be determined in a well known manner as a function of the ratio of the two powers. This is the gain with the steady-state signal from oscillator 17 for a repeater section of the cable. If the system is operating properly, a zero repeater-section gain should be indicated since the ordinary design condition is equal signal levels at the outputs of all repeaters.

Figure 4:
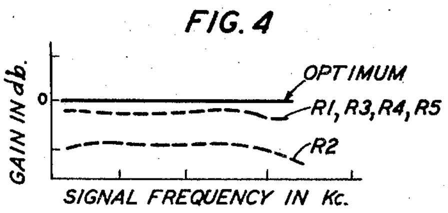
Fig. 4 is a gain-versus-frequency characteristic for a typical cable repeater section.

The gain data for each repeater section and at each of the test signal frequencies are plotted to show the response characteristic of such repeater section. A theoretical optimum response characteristic is prepared for the same repeater section by combining the factory-measured response of the repeater amplifier with the estimated response of the known length of cable in the repeater section. Such a theoretical optimum response characteristic for a repeater section is essentially a straight line at zero gain over the band of signal frequencies to be transmitted. This optimum is illustrated in Fig. 4 by the zero gain axis. The upper broken line curve in Fig. 4 represents the actual gain-versus-frequency response characteristic for the repeater sections which include the repeaters R1, R3, R4, and R5 as determined by the procedure hereinbefore described in connection with Figs. 1 through 3. The lower broken line curve represents the actual gain-versus-frequency response characteristic of the repeater section which includes the repeater R2 as determined by the above-described procedure.

It is possible with the method herein described, and the embodiment of Fig. 7 which will be described presently, to distinguish excessive cable attenuation from weak amplifier performance in any one repeater section. However, this bit of information is not essential as has been hereinbefore noted since entire repeater sections would be replaced as a unit. Furthermore, the important consideration is repeater output signal level. The computation of gain provides a convenient means for comparing such signal levels with optimum values to indicate amplifier operating level.

It will be observed from Fig. 4 that all of the repeater sections appear to be operating at a gain level which is substantially lower than the optimum gain level. Accordingly, the operating level of the cable system should be increased until the characteristics for repeater sections R1, R3, R4, and R5 are approximately coincident with the optimum characteristic. The increase in operating level could be accomplished by increasing the direct current voltage applied to the cable system, by increasing the input signal level, or by any suitable combination of changes in direct current voltage and input signal level. The characteristic of the repeater section including repeater R2, however, will still be a substantial amount below the optimum operating level. With presently available gain controlling techniques for remote repeaters it may not be practical to increase the gain of repeater R2 to correct this condition. It would not be desirable to increase the system operating level further because such an increase would cause the other repeaters in the system to be overdriven thereby shortening their life expectancy and perhaps introducing distortion. If it appears that the operating level of repeater R2 is so low that it may be expected to fail in the foreseeable future, then arrangements may be made for the replacement of this repeater section in order to group the operating characteristics of all of the repeaters in a smaller area closer to the theoretical optimum characteristic.

In prior art testing systems for remote repeaters an input signal is applied to the cable system and the amplitude of the output signal in the receiving terminal is measured. However, the amplitude of the signal which appears in the receiving terminal depends upon the operating condition of all of the repeaters in the cable system and consequently it provides only an approximate qualitative indication, not a quantitative indication, of the performance of each repeater. Consequently, the operating level of the cable system cannot be regulated with any substantial degree of precision. However, with this invention it is only necessary to detect a maximum in the cable output signal without regard to the amplitude of the maximum. For this reason, the accuracy of applicant's measuring system is independent of the performance level of all repeater sections in the cable system.

Figure 5:
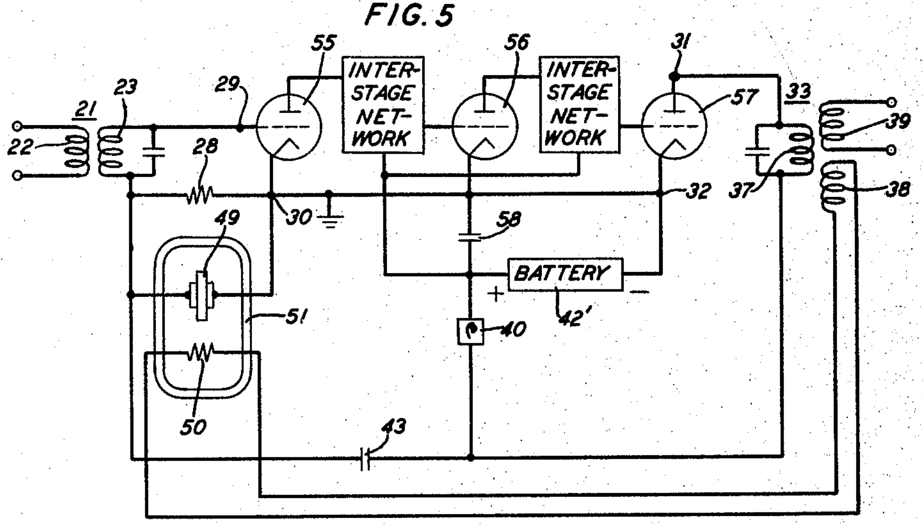
Figs. 5 through 9, inclusive, are schematic diagrams of five illustrative embodiments of the invention in repeater circuits.

Referring to Fig. 5, the embodiment described above in connection with Fig. 2 is illustrated in simplified form as it might be applied to the repeater described in the above-identified patent to Ilgenfrizt et al. Circuit elements in Fig. 5 which correspond to similar elements hereinbefore described in connection with Fig. 2 are designated by the same reference characters. In addition, the amplifier of Fig. 5 includes three electron discharge devices 55, 56, and 57 connected in tandem by suitable interstage coupling networks between input terminals 29 and 30 and output terminals 31 and 32. Input terminals 29 and 30 are connected to the control grid and cathode, respectively, of discharge device 55; and output terminals 31 and 32 are connected to the anode and cathode, respectively, of discharge device 57. Crystal 49 is connected in shunt with grid leak resistor 28 to provide a low impedance path for negative feedback signals from feedback capacitor 43 to ground in response to input signals at the resonant frequency of crystal 49. Battery 42' represents the source of operating potential for the repeater and includes the functions of battery 42 and load impedance 41 illustrated in Fig. 2. An alternating current by-pass capacitor 58 is connected between the feedback controlling impedance 40 and ground to by-pass signal potentials around battery 42'.

The operation of the circuit of Fig. 5 is similar to that described above for Fig. 2. The application of a signal including the resonant frequency of crystal 49 to input transformer 21 causes crystal 49 to shunt to ground the feedback voltages at the resonant frequency thereby increasing the gain of the repeater and increasing the output signal appearing across secondary winding 39 of output transformer 33 to a new high level which prevails as long as crystal 49 is in resonance.

Figure 6:
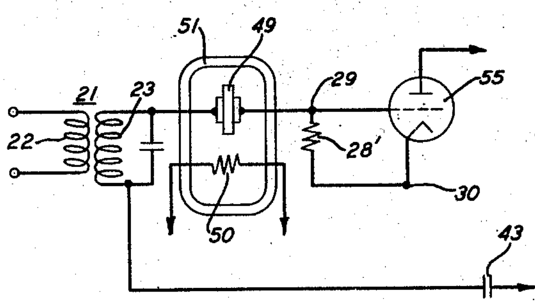

Referring to Fig. 6, a partial diagram of another embodiment of the invention is illustrated in which crystal 49 and its associated heater 50 and envelope 51 are arranged in the input circuit of discharge device 55 rather than being in the feedback circuit of the repeater. The crystal electrodes serve as the input capacitor for coupling signals from secondary winding 23 to the control grid of the discharge device 55. The grid leak resistor 28' is now connected directly between input terminals 29 and 30. The remainder of the amplifier circuit not shown in Fig. 6 is identical to that illustrated in Fig. 5.

The operation of the circuit of Fig. 6 is similar to the operation of the circuit of Fig. 5 except that in Fig. 6 the peak repeater output signal results from the reduced crystal impedance at resonance which appears in series in the repeater input circuit. The repeater output signal level measuring technique with the embodiment illustrated in Fig. 6 is identical to that described above in connection with Fig. 2.

Figure 7:
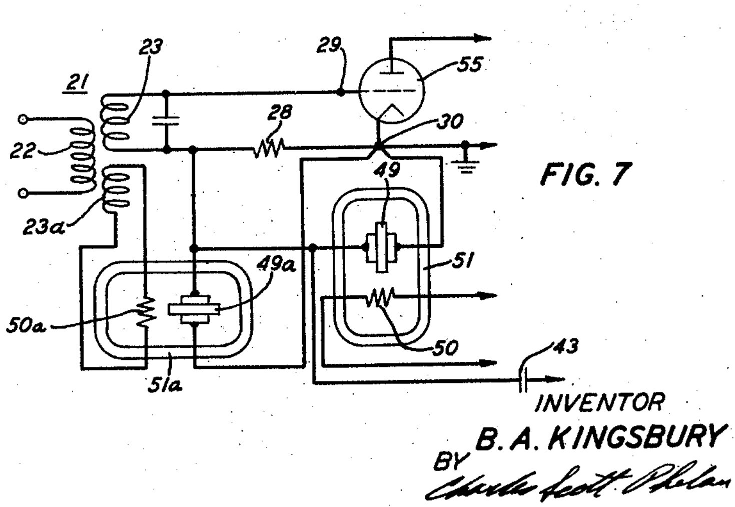

Referring to Fig. 7, a partial diagram of another embodiment of the invention is illustrated which is the same as the corresponding portion of Fig. 5 with the exception that an additional signal measuring apparatus has been added to measure the signal level at the input to the repeater. A further secondary winding 23*a* has been added to transformer 21. An additional heater 50*a* is connected across winding 23*a* and arranged in heat exchanging relation with a signature crystal 49*a* within an envelope 51*a*. Crystal 49*a* is electrically connected in parallel with crystal 49, i.e. in shunt in the repeater feedback circuit, and has a resonant frequency which is different from the resonant frequency of crystal 49.

The operation of the circuit of Fig. 7 is similar to the operation of the circuit of Fig. 5 except that in the circuit of Fig. 7 crystal 49*a* and heater 50*a* are responsive to repeater input signal level for producing, respectively, an irregularity in the gain-versus-frequency characteristic of the repeater and a change in the resonant frequency of crystal 49*a*. The method of operation of crystal 49*a* and heater 50*a* in response to repeater input signal level is similar to the method previously described for the operation of crystal 49 and heater 50 in response to repeater output signal level.

The circuit of Fig. 7 is utilized to obtain quantitatively both the output and the input signal levels in the repeater under study; and may, of course, be utilized in connection with any of the other embodiments of the invention. Knowing both the input and the output signal levels, the gain of each repeater and each cable section can be determined separately. With this information the operating level of the cable system can be adjusted with greater precision than is possible with the previously described embodiments to get the best compromise between optimum performance and long repeater life.

Figure 8:
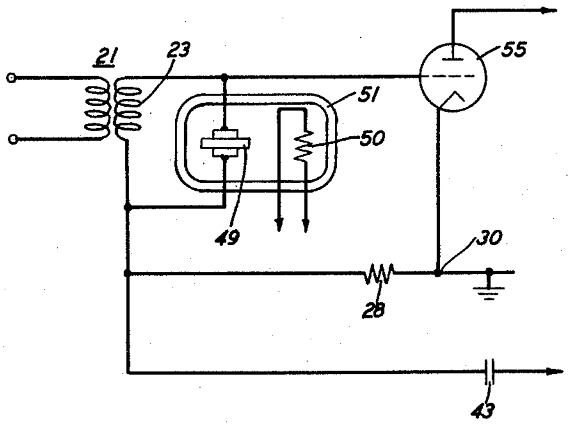

Referring to Fig. 8, a partial diagram of another embodiment of the invention is illustrated in which crystal 49 is shunted across secondary winding 23 in the input circuit of the repeater. This embodiment is otherwise the same as the embodiment of Fig. 5. The operation of the circuit of Fig. 8 is similar to the operation hereinbefore described in connection with Fig. 5 except that with crystal 49 in shunt in the input circuit the irregularity which is detected in the output circuit in the gain-versus-frequency characteristic is a minimum instead of a maximum.

Figure 9:
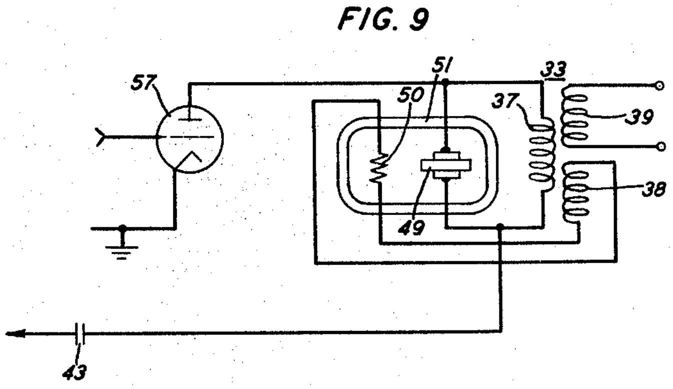

In Fig. 9 there is illustrated a partial diagram of a further embodiment of the invention in which crystal 49 is shunted across primary winding 37 in the output circuit of the repeater. The circuit of Fig. 8 is otherwise the same as the circuit of Fig. 5. The operation of the circuit of Fig. 9 is similar to the operation hereinbefore described in connection with Fig. 5 except that with crystal 49 in shunt in the output circuit the irregularity which is detected in the output circuit in the gain-versus-frequency characteristic is a minimum instead of a maximum.

While this invention has been described in connection with particular embodiments thereof it is to be understood that other embodiments which will be obvious to those skilled in the art are included within the spirit and scope of the appended claims.

What is claimed is:

1. A system for measuring the performance of an amplifier circuit, said system comprising said amplifier circuit having an output circuit and an input circuit, a temperature-sensitive resonant device connected in said amplifier for producing an irregularity in the gain-versus-frequency characteristic of said amplifier at the resonant frequency of said device, said resonant frequency being variable with the temperature of said device, heating means, means for changing the input signal amplitude to said amplifier and thereby changing the signal level in said amplifier, means for enclosing said heating means and said resonant device in heat exchanging relation whereby a determinable amount of heat produced in said heating means is transferred to said device, means responsive to the signal level of said amplifier for energizing said heating means to control the steady-state temperature of said device, and means connected to said amplifier for measuring the magnitude of changes in resonant frequency of said device in response to temperature changes, the change in said resonant frequency being a predetermined function of said operating level change.

2. A system for measuring the performance of an amplifier circuit, said system comprising said amplifier circuit having an output circuit and an input circuit, a temperature-sensitive resonant device connected in said amplifier for producing an irregularity in the gain-versus-frequency characteristic of said amplifier at a frequency which is variable with the temperature of said device, heating means arranged in heat exchanging relation with said device, means for changing the input signal amplitude to said amplifier and thereby changing the signal level in said amplifier, means responsive to the signal level of said amplifier for energizing said heating means to control the steady-state temperature of said device, and means connected to said amplifier for determining the magnitude of changes in the resonant frequency of said device in response to temperature changes, the changes in said resonant frequency being a predetermined function of said operating level change.

3. The measuring system in accordance with claim 2 in which a feedback circuit is provided for coupling said output circuit to said input circuit, and said resonant device is connected in shunt in said feedback circuit for substantially attenuating transmission in said feedback circuit at the resonant frequency of said device.

4. The measuring system in accordance with claim 2 in which the means for energizing said heating means is responsive to amplifier signal level in said output circuit, an additional temperature-sensitive resonant device is connected in shunt with the first-mentioned device, an additional heating means is arranged in heat exchanging relation with said additional device, means responsive to the signal level in said input circuit energize said additional heating means to control the steady-state temperature of said additional device, said frequency change determining means determining the changes in resonant frequency of said additional device in response to changes in temperature thereof.

5. The measuring system in accordance with claim 2 in which said resonant device is connected in series in said input circuit for increasing the gain-versus-frequency characteristic of said amplifier at the resonant frequency of said device.

6. The measuring system in accordance with claim 2 in which said resonant device is connected in shunt in said input circuit for decreasing the gain-versus-frequency characteristic of said amplifier at the resonant frequency of said device.

7. The measuring system in accordance with claim 2 in which said resonant device is connected in shunt in said output circuit for decreasing the gain-versus-frequency characteristic of said amplifier at the resonant frequency of said device.

8. The measuring system in accordance with claim 2 in which means are provided for coupling said means for energizing said heating means to said input circuit to control the steady-state temperature of said device in response to the signal level in said input circuit.

9. A system for measuring the performance of an amplifier circuit, said system comprising said amplifier circuit having an output circuit and an input circuit, a temperature-sensitive resonant device connected in said amplifier for producing an irregularity in the gain-versus-frequency characteristic of said amplifier, heating means connected in output current responsive relation to said amplifier, means for changing the input signal amplitude to said amplifier and thereby changing the output current of said amplifier, means for securing said heating means and said resonant device in heat exchanging relation to change the temperature of said device in response to said change in the output current of said amplifier, and means connected to said amplifier for measuring the change in resonant frequency of said device in response to said temperature change, the change in said resonant frequency being a calculable function of said output current change.

10. The measuring system in accordance with claim 9 in which a feedback circuit is provided for coupling said output circuit to said input circuit, and said resonant device is connected in shunt in said feedback circuit for substantially attenuating transmission in said feedback circuit at the resonant frequency of said device.

11. The measuring system in accordance with claim 9 in which said resonant device comprises a piezoelectric crystal having different primary resonant frequencies at different temperatures.

12. The measuring system in accordance with claim 11 in which said securing means comprises an insulated envelope enclosing said heating means and said resonant device in proximate relationship with one another.

13. A long distance communication system comprising terminal stations adapted to transmit and receive communications in a number of bands of frequencies, a transmission circuit connecting said stations and including a plurality of repeaters spaced at intervals therelong and each having a negative feedback circuit, temperature-sensitive devices connected across the feedback circuits to produce pronounced irregularities in the gain-frequency characteristics of the repeaters over narrow bands of frequencies, each band being uniquely characteristic of a repeater and of the temperature of its temperature-sensitive device, and resistance means connected in the output circuits of the repeaters and arranged in heat exchanging relation with said devices for controlling the temperatures of said devices in response to the output currents of said repeaters, respectively.

14. A long distance communication system comprising sending and deceiving terminal stations adapted to transmit and receive communications in a wide band of frequencies, a transmission channel connecting said stations and including a plurality of repeaters spaced at intervals therealong, each repeater including a crystal which is resonant at a frequency uniquely characteristic of the repeater to produce a pronounced irregularity in the gain-frequency characteristic of the repeater, the magnitude of said frequency being a function of the temperature of said crystal, and resistance means connected in the output circuit of the repeater and arranged in heat exchanging relation with said crystal for controlling the temperature of said crystal in response to the output current of its respective repeater.

15. A signal repeater comprising an amplifier, a temperature-sensitive device connected in said amplifier for producing a pronounced irregularity in the gain-frequency characteristic of said amplifier over a narrow band of frequencies, the center frequency of said band being variable with the temperature of said device, and resistance means connected in the output circuit of said amplifier and arranged in heat exchanging relation with said device, said resistance means changing the temperature of said device in response to changes in the output current of said amplifier.

16. The combination in claim 15 in which said device comprises a crystal connected in the input circuit of said repeater.

17. The combination in claim 16 in which a reverse feedback circuit is connected from the output circuit to the input circuit of said amplifier, and said crystal is connected across said feedback circuit.

18. A transmission channel including a plurality of repeaters spaced at intervals therealong, each repeater including a plurality of amplifying stages connected in cascade, crystals sharply resonant at different frequencies uniquely characteristic of the individual repeaters respectively connected in serial relationship with an impedance element across the output circuits of the repeaters, said crystals having predetermined temperature coefficients of resonant frequency, the crystals alone being also respectively connected in the input circuits of the repeaters, and electric heating means responsive to the output currents of said repeaters for controlling the temperatures of said crystals.

19. Means for selectively measuring the output signal current of at least one remote signal repeater which is connected in tandem with other repeaters in a transmission system, said measuring means comprising a piezoelectric crystal having different resonant frequencies at different temperatures, means for connecting said crystal in said one repeater for producing an irregularity in the gain-versus-frequency response characteristic thereof in response to a signal which includes the resonant frequency of said crystal, resistance means connected in the output of said one repeater, said resistance means radiating different amounts of heat in response to different amounts of current flowing therein, means for arranging said crystal and said resistance means in heat exchanging relation with one another, means for applying test signals to the input of said transmission system, said test signals comprising a voltage signal of adjustable steady-state amplitude and a voltage wave of calibrated variable frequency, a meter connected to the output of said system for indicating the output current level thereof, means for adjusting said steady-state amplitude successively to zero amplitude and then to at least one other predetermined amplitude thereby changing the output current from said one repeater in said resistance means and from said system, and means for varying the frequency of said wave to produce said irregularity at each of said steady-state amplitudes, the output current from said repeater at said other predetermined amplitude being calculable as a function of the change in frequency of said wave.

20. The measuring system in accordance with claim 19 in which said repeater is provided with a negative feedback circuit for coupling the output to the input thereof, and said crystal is connected in shunt in said feedback circuit for blocking said negative feedback coupling in response to a singal which includes the resonant frequency of said crystal.

References Cited in the file of this patent

UNITED STATES PATENTS

| | | |
|---|---|---|
| 2,425,002 | Pfleger | Aug. 5, 1947 |
| 2,580,097 | Ilgenfritz | Dec. 25, 1951 |